United States Patent [19]

Becker et al.

[11] Patent Number: 4,765,708

[45] Date of Patent: Aug. 23, 1988

[54] STORAGE DEVICE FOR A SPARE LENGTH OF AN OPTICAL LINE

[75] Inventors: Johann A. Becker, Overath; Peter G. Deusser; Werner V. Zell, both of Cologne, all of Fed. Rep. of Germany

[73] Assignee: U.S. Philips Corporation, New York, N.Y.

[21] Appl. No.: 905,226

[22] Filed: Sep. 8, 1986

[30] Foreign Application Priority Data

Sep. 11, 1985 [DE] Fed. Rep. of Germany ....... 3532314

[51] Int. Cl.⁴ ................................................. G02B 6/36
[52] U.S. Cl. ............................. 350/96.20; 350/96.21; 350/96.22
[58] Field of Search ............... 350/96.10, 96.15, 96.16, 350/96.20, 96.21, 96.22, 96.23

[56] References Cited

U.S. PATENT DOCUMENTS

| 4,332,435 | 6/1982 | Post .................... | 350/96.20 |
| 4,478,486 | 10/1984 | Fentress et al. ............ | 350/96.20 |
| 4,498,732 | 2/1985 | Cambell et al. ............ | 350/96.20 |
| 4,685,764 | 8/1987 | Hoffer et al. .............. | 350/96.20 |
| 4,699,460 | 10/1987 | Szentesi ................... | 350/96.21 |
| 4,702,551 | 10/1987 | Coulombe .................. | 350/96.20 |
| 4,722,585 | 2/1988 | Boyer ..................... | 350/96.20 |

FOREIGN PATENT DOCUMENTS

| 2721300 | 11/1978 | Fed. Rep. of Germany ... 350/96.20 X |
| 3006131 | 9/1981 | Fed. Rep. of Germany ... 350/96.20 |
| 3248003 | 6/1984 | Fed. Rep. of Germany ... 350/96.20 X |
| 2517077 | 5/1983 | France .................... 350/96.23 |
| 2573544 | 5/1986 | France .................... 350/96.21 |
| 55-45053 | 3/1980 | Japan ..................... 350/96.21 |

Primary Examiner—William L. Sikes
Assistant Examiner—Brian M. Healy
Attorney, Agent, or Firm—Thomas A. Briody; Jack E. Haken

[57] ABSTRACT

A storage device for a spare length of an optical line, comprising a flat storage space in which the spare length is wound at a radial distance round a central core and led out by its ends through peripheral openings from which one free end can be withdrawn, accompanied by reduction of the diameter of the turns. The device further comprises lateral guide walls at right angles to the central core and outer peripheral walls to limit the diameter of the turns. To permit the unobstructed withdrawal and sliding back in again of an end of an optical line despite an extremely flat construction, the arrangement is such that the distance between the guide walls (6 to 10 and 11 to 16) is slightly greater than the width of the optical line (1 to 5) and smaller than 1.3 times that width, the turns of the optical line extending spirally in a plane, the removable end (32) being formed by the turn located radially outside and the other fixed end leading outside the plane of the turns over the outer turns to the innermost turn.

20 Claims, 2 Drawing Sheets

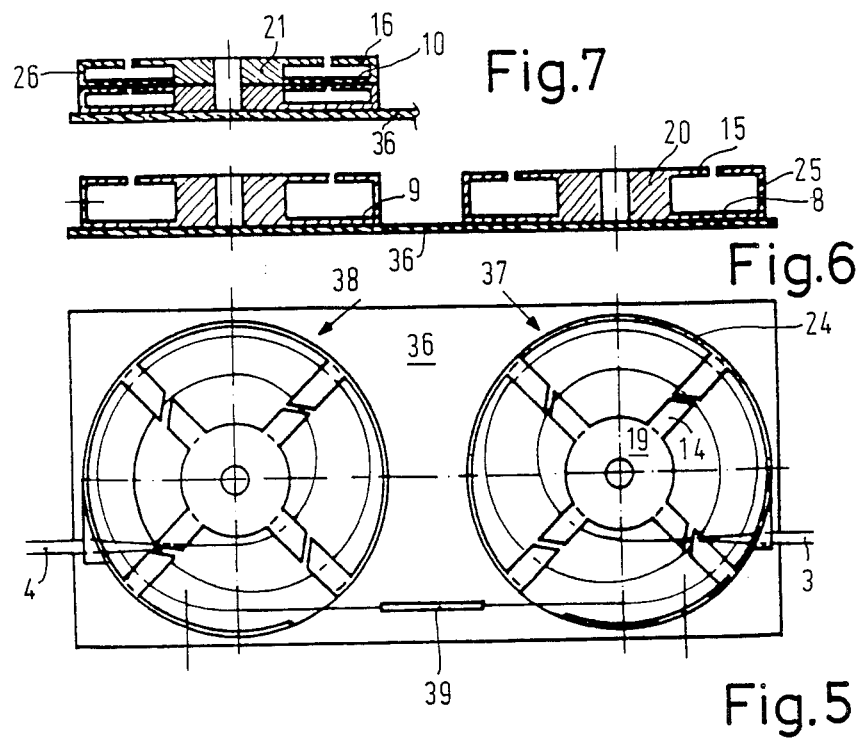
Fig.7
Fig.6
Fig.5
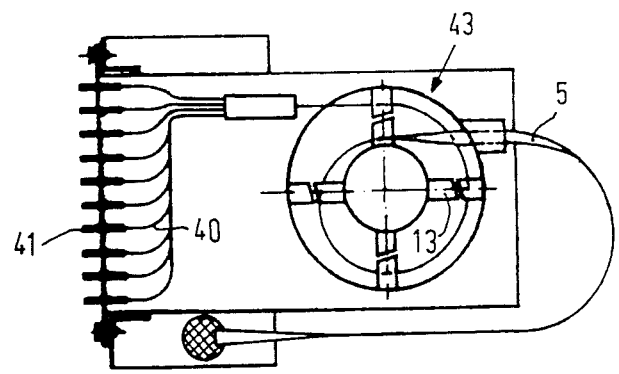
Fig.8

STORAGE DEVICE FOR A SPARE LENGTH OF AN OPTICAL LINE

BACKGROUND OF THE INVENTION

The invention relates to a storage device for a spare length of an optical line, comprising a flat storage space, in which the spare length is wound at a radial distance round a central core and from which it is led out by its ends through peripheral openings from which a free end can be pulled out, accompanied by reduction of the diameter of the turns, the device further comprising guide walls at right angles to the central core and outer peripheral walls to limit the diameter of the turns.

A device of this type is known from DE-OS No. 32 48 003. In this device, light conducting fibres are laid in loops comprising several turns. When an end is pulled out, there is a danger of the turns jamming together, so that it is impossible to push the end back in again. Additionally, the storing of ribbon cables consisting of several fibres joined to each other would necessitate tall storage containers to suit the number of turns to be laid alongside each other.

SUMMARY OF THE INVENTION

It is an object of the invention to construct a storage device of the kind referred to in the preamble in such a way that, with an extremely flat construction, unimpeded withdrawal and re-insertion of an end of an optical line, which may be a ribbon cable is possible.

The device according to the invention is characterized in that the distance between the guide walls is greater than the width of the optical line and smaller than 1.3 times that width, the turns of the optical line extending spirally in a plane, the removable end being formed by the turn located radially outside and the other, fixed end leading outside the plane of the turns, over the outer turns to the inner most turn.

Owing to the spiral placement of the turns radially one after the other in a plane, extremely flat containers result. At the same time, the turns are arranged in a well-defined manner. The pulling-out or re-insertion of the free end is easily performed and jamming is impossible when the free end is formed by the turn located radially outside. A plurality of turns can therefore be wound in the storage space without difficulty. Even when the radial dimensions of the storage device according to the invention are small, large spare lengths can be accommodated in it.

To ensure that even when an end of the optical line is drawn out fully and firmly, the permissible smallest bending radius is respected, the diameter of the core should be chosen greater than 40 mm, and preferably greater than 50 mm.

Optimum utilisation of the storage space is obtained when the number n of turns is $$n = k \cdot \frac{D - d}{d_o},$$

where
d = the diameter of the core,
D = the maximum diameter of the outermost turn
$d_o$ = the width of the optical line and
$0.2 < k < 0.3$, and preferably $k = 0.25$.

The change of diameter of the turns during the pulling-out or pushing back in the free end of the optical line is not impeded by the fixed end of the optical line leading from the outside to the inside, if the fixed end of the optical line lies in a guide channel extending obliquely from a peripheral point in a plane outside the plane of the turns to at least approximately the circumferential surface of the core.

A guide channel of this kind is preferably open at least partly to one of the flat sides of the device so that it is easily manufactured and the end of the optical line can be laid in easily.

A preferred embodiment for the laying-in of a ribbon cable is characterized in that the guide channel is shaped rectangularly in accordance with the cross-section dimensions of a ribbon cable and is twisted in such a way that radially outside the direction of its width is parallel to the plane of the turns and radially inside parallel to the cylindrical surface of the core. This ensures that practically no heightening of the storage device is required for the fixed end because it runs flat in the space which is required in any case for the guide wall. Additionally, sharp bends are avoided. A following turn is not immediately adjacent to the fixed end in the area where it is twisted but only where it extends parallel to the cylindrical surface of the core.

A plurality of the storage devices according to the invention may be arranged coaxially above one another and be joined by interlocking elements.

It is not essential for the lateral guide walls to take the form of closed surfaces. A preferred embodiment is characterized in that the guide walls consist on at least one side of at least three radially extending guide spokes, which are interrupted in their central area by lead-in slots. The turns of the optical lines can be brought in through these slots. If they run obliquely to the tangent of the turns of the optical line, subsequent accidental sliding-out will be prevented.

Another advantageous embodiment is characterized in that it has a central winding section which can be inserted disconnectably in an outer section which forms the outer peripheral walls and radially outer sections of the lateral guide walls.

BRIEF DESCRIPTION OF THE DRAWING

The invention will be further explained with reference to the drawing.

FIG. 5 shows a typical example of application for storage devices according to the invention.

FIG. 6 shows a cross-section through the arrangement shown in FIG. 5.

FIG. 7 shows a cross-section through two storage devices stacked on to the other.

FIG. 8 shows a further example of application for the use of a storage device according to the invention.

DESCRIPTION OF THE PREFERRED EMBODIMENTS

Figure 1:
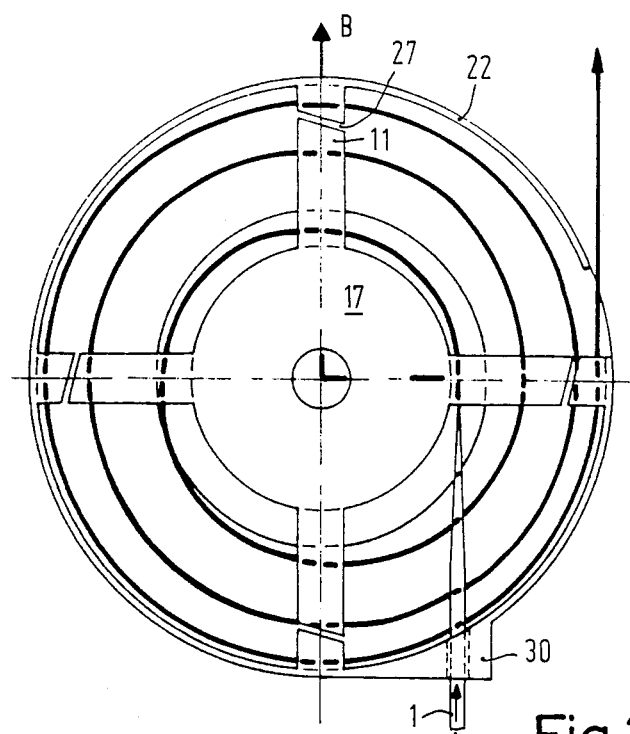
FIG. 1 shows a two-part storage device in accordance with the invention for the storage of several turns of a ribbon-shaped optical line.

The shown embodiments of storage devices according to the invention are in each case adapted to the storage of flat ribbon-shaped optical lines 1 to 5. Ribbon cables of this kind consist of several individual light conducting fibres joined side by side in a plane. The free height between the lateral guide walls, namely the closed rear walls 6 to 10 on the one hand and the front walls consisting of radial spokes 11 to 16 on the other hand, has then to be chosen slightly greater than the width of the ribbon lines. It should not exceed 1.3 times that width to ensure smooth, orderly guidance in a spiral.

If, however, the storage device according to the invention has to be used for the storage of round cables or single light conducting fibres, the free height is slightly greater than the diameter of the cables or fibres.

The diameter of cores 17 to 21 is 50 mm. The minimal bending radii of the innermost turn are in the event of direct contact with the core definitely greater than the minimum permissible value for light waveguides.

The diameter D of the outer guide walls 22 to 26 is preferably 1.8 to 2.2 times the core diameter d. With this ratio there results a good storage capacity with relatively small external dimensions. The outer peripheral walls need not necessarily be cylindrical; they can also consist of flat elements meeting each other at an angle, with which the outermost turn is in contact at points.

For given values of D and d and also of diameter $d_o$ of a round cable or a light conducting fibre or the thickness of a ribbon cable (smaller cross-section side) a maximum pull-out length is obtained if the number n of turns is chosen as approximately $$n = k \cdot \frac{D - d}{d_o}$$

with k=0.25. Values of $0.2 < k < 0.3$ nevertheless lead to results which can be used in practice.

Figure 2:
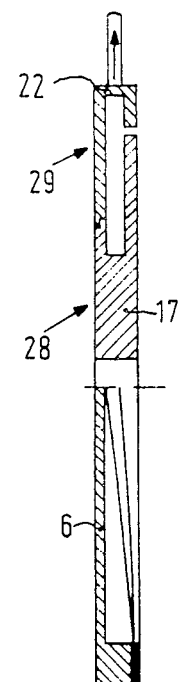
FIG. 2 shows a cross-section along line A-B through the embodiment shown in FIG. 1.

For greater clarity of presentation, the embodiment shown in FIGS. 1 and 2 is drawn with only 3 turns of the optical ribbon cable 1; these can be threaded through the lead-in slots 27 which, as in the other Figures, run obliquely to the tangential direction of the turns, so that unintentional sliding-out of turns once laid is prevented. If, however, as in the embodiment, the storage device consists of separate mating parts (the winding-up part 28 and the outside part 29), the turns can be wound round the core 17 of the winding part 28 in simple fashion before the two parts are fitted together.

The fixed part of the ribbon cable 1 leading to the inner turn is led freely between the bearing surface on the circumference of the core 17 and the shoulder 30 mounted radially outside. In this area the cross-section plane of ribbon cable 1 twists from a position flush with the plane of the guide wall into a position parallel to the circumferential surface 17. It is thus not completely impossible for the section of cable 1 laid over the turns to come into contact with the turns underneath and interfere with their sliding movement. If, as in the embodiments, radial spokes 11 are used as guide walls, between which large areas remain open, so that the turns area accessible, any jamming that occurs can be easily cleared.

Figure 3:
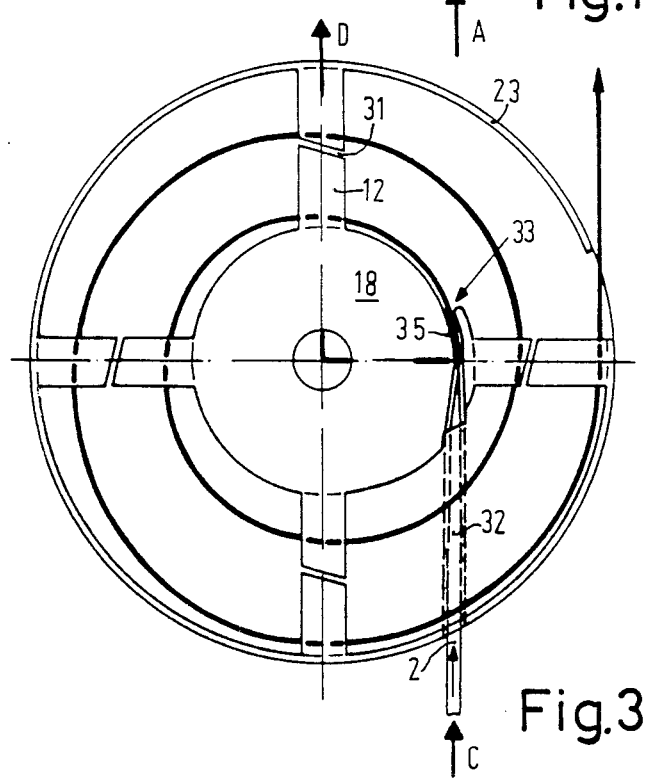
FIG. 3 shows a single-level embodiment similar to FIG. 1, but with a lead-in channel for the fixed end of the optical line.
Figure 4:
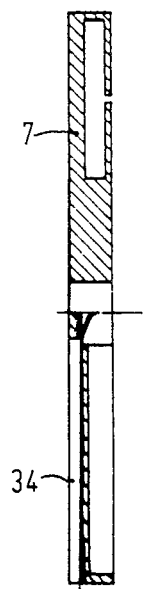
FIG. 4 shows a cross-section along line C-D in FIG. 3.

Particularly if two or more of the storage devices according to the invention are stacked one above the other as in FIG. 7, an embodiment as shown in FIGS. 3 and 4 is to be recommended. It is drawn as consisting of one piece but can, of course, be constructed from several individual parts. The ribbon cable 2 is introduced through the oblique slots 31 in the spoke-like guide walls 12. Unlike the basically similar embodiment shown in FIGS. 1 and 2, the fixed end of the ribbon cable 2 is laid in a lead-in channel up to the point of exit 33. It first runs flat through a groove 34 in the guide wall 7 which is open at the bottom and enters the storage space between guide walls 7 and 12 in the vicinity of the circumferential surface of core 18. It then runs turning regularly up to an angle of 90° at point 33, through a groove 35 in the core 18 which groove is open at the side of walls 12. The end 32 can therefore not impede the spiral turns since it is protected against contact with the subsequent turns by walls of the lead-in channel consisting of the grooves 34 and 35. In designing the groove 35 it is important to ensure that the minimum permissible bending radius of the light conducting fibres is respected everywhere. The way of twisting is determined in the manner indicated above.

A typical area of application of the storage devices according to the invention is a coupling sleeve as shown in FIG. 5, in which only one wall of the housing 36 is shown. The spare length of the first ribbon cable 3 is housed in storage device 37, that of the ribbon cable 4 in the similar storage device 38. For the convenient making of the splices the stored spare lengths can first be pulled out and then, after completion of the splices, slid back into the storage device.

For cases in which, instead of a ribbon cable 4, a ribbon cables containing fewer light waveguides and being correspondingly narrower are supplied, FIG. 7 shows two storage devices stacked one upon the other, each with storage spaces adapted to the narrower widths of the individual ribbon cables.

FIG. 8 shows an end termination for a ribbon cable 5. The spare lengths required for making the connections of the individual light conducting fibres 40 with the connector elements 41 are stored in the storage device 43.

What is claimed is:

1. A storage device for a spare length of an optical line, comprising a flat storage space, in which the spare length is wound at a radial distance round a central core and from which the spare length is led out by ends of the spare length through peripheral openings from which a free end can be pulled out, accompanied by reduction of the diameter of the turns, the device further comprising lateral guide walls at right angles to the central core and outer peripheral walls to limit the diameter of the turns, characterized in that the distance between the guide walls (6 to 10 and 11 to 26) is greater than the width of the optical line (1 to 5) and smaller than 1.3 times that width, the turns of the optical line extending spirally in a plane substantially parallel to the guide walls, a removable end (32) being formed by the turn located radially outside, and a fixed end leading outside the plane of the turns over the outer turns to the innermost turn.

2. A device as claimed in claim 1, characterized in that the diameter d of the core (17 to 21) is greater than 40 mm.

3. A device as claimed in claim 1 or 2, characterized in that the number n of turns is $$n = k \frac{D - d}{d_o},$$

where d = the diameter of the core
D = the maximum diameter of the outermost turn
$d_o$ = the width of the optical line and
$0.2 < k < 0.3$, and preferably $k = 0.25$.

4. A device as claimed in claim 3, characterized in that the optical line (1 to 5) is a round light conducting fibre.

5. A device as claimed in claim 3, characterized in that the optical line is a ribbon cable (1 to 5) comprising light conducting fibres that are joined alongside each other.

6. A device as claimed in claim 5, characterized in that the fixed end (32) of the optical line lies in a guide channel (34, 35) extending obliquely from a peripheral point in a plane outside the plane of the turns to at least approximately the circumferential surface of the core.

7. A device as claimed in claim 6, characterized in that the guide channel (34, 35) is open at least partly to one of the flat sides of the device.

8. A device as claimed in claim 7, characterized in that the guide channel is shaped rectangularly in accordance with the cross-section dimensions of a ribbon cable (2) and is twisted in such a way that radially outside the direction of its width is parallel to the plane of the turns and radially inside (point 33) parallel to the cylindrical surface of the core (18).

9. A device as claimed in claim 8, characterized in that the light conductors of the free end of the optical line (5) are connected to connector elements (41) which are arranged together with the take-up device in an end-terminating housing.

10. A device as claimed in claim 9, characterized in that the guide walls consist on at least one side of at least three radially extending guide spokes (11 to 16), which are interrupted in their central area by lead-in slots (27, 31).

11. A device as claimed in claim 10, characterized in that the lead-in slots (27, 31) run obliquely to the tangent of the turns of the optical line (1 to 5).

12. A device for storing a spare length of an optical fiber, said device comprising:
a substantially cylindrical core having a cylinder axis;
first and second lateral guide walls arranged transverse to the cylinder axis and attached to the cylindrical core so as to define an annular disk-shaped space between the guide walls, the guide walls being separated by a distance h;
an outer peripheral wall attached to the lateral guide walls, said outer peripheral wall being arranged opposite the core;
an optical fiber arranged in the annular disk-shaped space, said fiber being wound spirally around the core substantially in a single plane, said fiber being wound loosely around the core, said wound fiber having an innermost portion, an outermost portion, and an intermediate portion, the outermost portion exiting the annular space by passing through an opening in the outer peripheral wall, the innermost portion exiting the annular space by passing through a lateral guide wall.

13. A device as claimed in claim 12, characterized in that:
$d_o < h < 1.3 d_o$, where $d_o$ is the diameter of the optical fiber; and
the outer peripheral wall traces a circular path.

14. A device as claimed in claim 13, characterized in that:
the innermost portion of the wound fiber passes over the intermediate portion of the wound fiber; and
one lateral guide wall comprises a guide duct for separating the innermost portion of the wound fiber from the intermediate portion of the wound fiber where the innermost portion passes over the intermediate portion.

15. A device as claimed in claim 14, characterized in that one lateral guide wall comprises at least three beams extending radially from the core.

16. A device as claimed in claim 15, characterized in that each beam has a central lead-in slot.

17. A device for storing a spare length of an optical line, said device comprising:
a substantially cylindrical core having a cylinder axis;
first and second lateral guide walls arranged transverse to the cylinder axis and attached to the cylindrical core so as to define an annular disk-shaped space between the guide walls, the guide walls being separated by a distance h;
an outer peripheral wall attached to the lateral guide walls, said outer peripheral wall being arranged opposite the core;
an optical line arranged in the annular disk-shaped space, said line being wound spirally around the core substantially in a single plane, said line being wound loosely around the core, said wound line having an innermost portion, an outermost portion, and an intermediate portion, the outermost portion exiting the annular space by passing through an opening in the outer peripheral wall, the innermost portion exiting the annular space by passing through a lateral guide wall.

18. A device as claimed in claim 17, characterized in that:
$d_o < h < 1.3 d_o$, where $d_o$ is the width of the optical line; and
the outer peripheral wall traces a circular path.

19. A device as claimed in claim 18, characterized in that:
the innermost portion of the wound line passes over the intermediate portion of the wound line; and
one lateral guide wall comprises a guide duct for separating the innermost portion of the wound line from the intermediate portion of the wound line where the innermost portion passes over the intermediate portion.

20. A device as claimed in claim 19, characterized in that the optical line is a ribbon cable comprising at least two optical fibers joined alongside each other.

* * * * *